(12) United States Patent
Li et al.

(10) Patent No.: US 11,215,807 B2
(45) Date of Patent: Jan. 4, 2022

(54) MICROSCOPE HAVING A BUTTON FOR SWITCHING BETWEEN FUNCTIONS OF A FOCUS KNOB

(71) Applicant: CARL ZEISS MICROSCOPY GMBH, Jena (DE)

(72) Inventors: Zhongyu Li, Shanghai (CN); Lei Cai, Shanghai (CN); Tian Xia, Shanghai (CN); Jochen Schweizer, Shanghai (CN); Ralph Aschenbach, Hardegsen-Hevensen (DE); Guang Mei Wu, Shanghai (CN); Ronghua Song, Shanghai (CN)

(73) Assignee: CARL ZEISS MICROSCOPY GMBH, Jena, DE (US)

( * ) Notice: Subject to any disclaimer, the term of this patent is extended or adjusted under 35 U.S.C. 154(b) by 179 days.

(21) Appl. No.: 16/490,446

(22) PCT Filed: Mar. 1, 2018

(86) PCT No.: PCT/EP2018/055040
§ 371 (c)(1),
(2) Date: Aug. 30, 2019

(87) PCT Pub. No.: WO2018/158364
PCT Pub. Date: Sep. 7, 2018

(65) Prior Publication Data
US 2020/0073105 A1   Mar. 5, 2020

(30) Foreign Application Priority Data

Mar. 3, 2017 (CN) .......................... 201710124508.6

(51) Int. Cl.
*G02B 21/26* (2006.01)
*G02B 21/24* (2006.01)

(52) U.S. Cl.
CPC .......... *G02B 21/26* (2013.01); *G02B 21/242* (2013.01); *G02B 21/248* (2013.01)

(58) Field of Classification Search
CPC .... G02B 21/26; G02B 21/242; G02B 21/248; G02B 21/00; G02B 21/0004; G02B 21/24; G02B 21/241; G02B 21/36; G02B 21/362
(Continued)

(56) References Cited

U.S. PATENT DOCUMENTS 5,000,555 A * 3/1991 Sato ....................... G02B 21/26
200/52 R
5,684,627 A   11/1997 Ganser et al.
(Continued)

FOREIGN PATENT DOCUMENTS

DE   2009/037016 A1   2/2011
WO   2018/158364 A1   9/2018

OTHER PUBLICATIONS

International Search Report dated Jun. 8, 2018 in PCT/EP2018/055040, pp. 33-34.

*Primary Examiner* — Arnel C Lavarias
(74) *Attorney, Agent, or Firm* — Shook, Hardy & Bacon, L.L.P.

(57) ABSTRACT

A microscope, including an x motor, a y motor, and a z axis focusing driving mechanism that drive a stage to move; at least one knob operatively coupled to the x motor or y motor or the z axis focusing driving mechanism selectively via a controller; and at least one button coupled to the controller in communication. The controller is configured to disconnect a normal operative coupling between the knob and the z axis focusing driving mechanism and establish an operative coupling between the knob and the x motor or y motor when receiving a predetermined button signal, and restore the normal operative coupling between the knob and the z (Continued)

axis focusing driving mechanism and disconnect the operative coupling between the knob and the x motor or y motor when no longer receiving the predetermined button signal or when receiving a next button signal.

14 Claims, 5 Drawing Sheets

(58) Field of Classification Search
USPC ....... 359/393, 362, 363, 368, 369, 391, 392, 359/379, 380, 432
See application file for complete search history.

(56) References Cited

U.S. PATENT DOCUMENTS

| | | |
|---|---|---|
| 2003/0090789 A1 | 5/2003 | Herz et al. |
| 2004/0114220 A1 | 6/2004 | Ganser et al. |
| 2004/0190129 A1 | 9/2004 | Katja et al. |

* cited by examiner

MICROSCOPE HAVING A BUTTON FOR SWITCHING BETWEEN FUNCTIONS OF A FOCUS KNOB

CROSS-REFERENCE TO RELATED APPLICATIONS

This application claims priority under 35 U.S.C. § 365 to PCT/EP2018/055040, filed Mar. 1, 2018, entitled "MICROSCOPE," which claims priority to China Patent Application No. 2017/10124508.6, filed Mar. 3, 2017, the entirety of the aforementioned applications are incorporated by reference herein.

TECHNICAL FIELD

The invention relates to the microscopy field, and more particularly to a microscope and a method for operating and controlling the microscope.

BACKGROUND ART

In a microscope, for effective observation of a specimen on the stage, the positions of the stage along the left-right, front-rear, and up-down directions must be adjusted so that a specific region of the specimen appears in the field of view with proper resolution. In the prior art, an ordinary electric microscope, for example, is provided with a focus knob to adjust the raising and lowering of the stage (i.e. up-down position) by means of pinion and rack transmission or electric motor transmission, and there is usually an additional joystick (control handle) for adjusting the position of the stage in the horizontal plane (left-right and front-rear directions). This necessitates an additional external control device for operation of the microscope, which increases the system cost. Besides, when using a joystick to horizontally move the stage, the microscope operator needs to turn his/her eyes away from the eyepiece to look for the position of the joystick and then turns back to the eyepiece so as to horizontally adjust the stage by operating the joystick during observation, which is inconvenient.

As more and more functions are introduced into an automated microscope, the number of various buttons and keys is increased and it is difficult for the user to remember their positions. Also, the designer can hardly layout so many buttons and keys in an ergonomic way. Therefore, some microscope producers tend to adopt PC or touch pad, which can integrate many buttons and keys more conveniently, to perform various functions of the microscope. The disadvantage of this way is also that if the microscope operator operates the microscope in a stand-alone mode (i.e. without aid of computer or software), he/she have to shift his/her eyes away from the eyepiece and look at the touch pad for operation, and then back to the eyepiece.

In the U.S. Pat. No. 7,259,908B2, the focus knob can only be used to control raising and lowering of the stage, while the peripheral buttons are used to control rotation of objective nosepiece and reflector turret to realize switching of the working objective lens and the working reflector. This design improves the human-machine interaction experience for the operator to some extent and is easy for operation. However, the patent does not disclose how to ergonomically control movement of the stage of the microscope in the horizontal plane, and the focus knob can only be used for controlling raising and lowering of the stage in the Z axis direction.

In addition, along with increasing of automation and integration of the microscope, more and more functional elements are integrated into the microscope. How to conveniently, precisely, and efficiently control various functions and parts of a microscope has become an increasingly focused concern of this technical field.

The invention aims to solve the above and other problems in the prior art.

SUMMARY OF THE INVENTION

The aim of the invention can be achieved by the microscope as described hereinafter.

According to a first aspect of the invention, a microscope is provided which comprises: a stage; an x motor, a y motor, and a z axis focusing driving mechanism that drive the stage to move along left-right, front-rear, and up-down directions respectively; a controller; at least one knob which is operatively coupled to the x motor and/or y motor or the z axis focusing driving mechanism selectively by means of the controller to control operation of the coupled motor or the coupled z axis focusing driving mechanism; and at least one button which is coupled to the controller in communication and sends to the controller one or more types of button signals indicating that the button has been triggered by operation of the microscope user, wherein the controller is configured to disconnect a normal operative coupling between the knob and the z axis focusing driving mechanism and establish an operative coupling between the knob and the x motor and/or y motor when receiving a triggered predetermined button signal, and restore the normal operative coupling between the knob and the z axis focusing driving mechanism and disconnect the operative coupling between the knob and the x motor and/or y motor when no longer receiving the triggered predetermined button signal or when receiving a next triggered button signal.

In an exemplary configuration of the microscope according to the first aspect of the invention, the at least one button may include an x button and a y button, and the controller is configured to establish or disconnect the operative coupling between the knob and the x motor according to the button signal from the x button, and establish or disconnect the operative coupling between the knob and the y motor according to the button signal from the y button.

In an exemplary configuration of the microscope according to the first aspect of the invention, the at least knob may include a first knob and a second knob which are configured to be able to establish or disconnect the operative coupling with the x motor and the y motor respectively by operating the button.

In an exemplary configuration of the microscope according to the first aspect of the invention, the z axis focusing driving mechanism may be a z motor; and a rotary encoder may be installed on the knob, which rotary encoder converts the angular displacement of the knob to an electric pulse signal for controlling operation of the x motor, y motor, or z motor.

In an exemplary configuration of the microscope according to the first aspect of the invention, the controller may include a main controller, a z controller coupled to the z motor and the main controller, and an xy controller coupled to the x motor, the y motor, and the main controller; the main controller is configured to receive a button signal from the button and send the button signal to the z controller; the z controller is configured to receive the electric pulse signal from the knob, forward the electric pulse signal to the main controller when receiving the triggered predetermined button signal without controlling the z motor according to the electric pulse signal, and restore the control of the z motor according to the electric pulse signal when no longer receiving the triggered predetermined button signal or when receiving a next triggered button signal; the main controller is further configured to calculate the amount and direction of movement according to the electric pulse signal when receiving it from the z controller and send a corresponding movement instruction to the xy controller; and the xy controller is configured to control operation of the x motor and/or y motor according to the movement instruction received from the main controller.

In an exemplary configuration of the microscope according to the first aspect of the invention, the button may be arranged in the vicinity of the knob so that the user can operate the knob and the button simultaneously with the same hand, or may be arranged at an end of the knob, or may be arranged inside the knob so that the operation direction of the button is parallel to the direction of a rotation axis of the knob.

In an exemplary configuration of the microscope according to the first aspect of the invention, the button may be an illuminative button or a button that can light an illuminative device, which is configured to be lighted and extinguished respectively when the operative coupling between the knob and the x motor and/or the y motor is established and disconnected by means of the button signal emitted by it.

In an exemplary configuration of the microscope according to the first aspect of the invention, at least one of the knob may be a composite knob consisting of a coarse adjusting wheel and a fine adjusting wheel which are coaxially arranged.

In an exemplary configuration of the microscope according to the first aspect of the invention, the coarse adjusting wheel and the fine adjusting wheel may share one rotary encoder or may be provided with their respective rotary encoders.

According to a second aspect of the invention, a microscope is provided which comprises: a stage; a controller; at least one knob which is operatively coupled to the stage selectively by means of the controller to control movement of the stage; and at least one button which is coupled to the controller in communication and sends to the controller one or more types of button signals indicating that the button has been triggered by operation of the microscope user, wherein the controller is configured to disconnect a normal operative coupling between the knob and the stage and establish an operative coupling between the knob and other elements of the microscope to control operations of the said other elements when receiving a triggered predetermined button signal, and restore the normal operative coupling between the knob and the stage and disconnect the operative coupling between the knob and the said other elements when no longer receiving the triggered predetermined button signal or when receiving a next triggered button signal.

In an exemplary configuration of the microscope according to the second aspect of the invention, the said other elements of the microscope may include an objective nosepiece and/or a reflector turret and/or a menu of an On-Screen-Display (OSD) system of the microscope, a microscope settings memory and an illumination device.

In an exemplary configuration of the microscope according to the second aspect of the invention, the knob may be configured to control during its rotation the rotation of the objective nosepiece and/or the rotation of the reflector turret and/or the scrolling of menu items of the OSD system of the microscope.

In an exemplary configuration of the microscope according to the second aspect of the invention, the button may be configured to trigger the function(s) of photographing and/or video recording of a microscope camera and/or saving settings in a microscope settings memory, like the parfocal position of the current working objective lens and/or loading/unloading position of the stage when operated in a predetermined way.

In an exemplary configuration of the microscope according to the second aspect of the invention, a rotary encoder may be installed on the knob, which rotary encoder converts the angular displacement of the knob to an electric pulse signal for controlling operation of a driving device that drives the stage or the said other elements.

In an exemplary configuration of the microscope according to the second aspect of the invention, the at least one knob may be a composite knob consisting of a first adjusting wheel and a second adjusting wheel which are coaxially arranged.

In an exemplary configuration of the microscope according to the second aspect of the invention, the button may be arranged in the vicinity of the knob so that the user can operate the knob and the button simultaneously with the same hand, or may be arranged at an end of the knob, or may be arranged inside the knob so that the operation direction of the button is parallel to the direction of a rotation axis of the knob.

In an exemplary configuration of the microscope according to the second aspect of the invention, the said other elements may include an objective nosepiece and a reflector turret of the microscope; the first adjusting wheel is configured to control during its rotation the rotation of one of the objective nosepiece and the reflector turret, and the second adjusting wheel is configured to control during its rotation the rotation of the other of the objective nosepiece and the reflector turret.

In an exemplary configuration of the microscope according to the second aspect of the invention, the said other elements may include an objective nosepiece and a reflector turret of the microscope; the at least one knob includes two knobs arranged at the left side and right side of the microscope respectively; the left knob is configured to control during its rotation the rotation of one of the objective nosepiece and the reflector turret, and the right knob is configured to control during its rotation the rotation of the other of the objective nosepiece and the reflector turret.

In an exemplary configuration of the microscope according to the second aspect of the invention, the said other elements may include an OSD system of the microscope; the first adjusting wheel is configured to make a selection during its rotation by scrolling among items in the same level of menu of the OSD system, and the second adjusting wheel is configured to switch during its rotation between adjacent levels of menu of the OSD system; the composite knob further includes a confirmation button configured to confirm the selection of a menu item when being operated.

In an exemplary configuration of the microscope according to the second aspect of the invention, the first adjusting wheel and the second adjusting wheel may share one rotary encoder or may be provided with their respective rotary encoders.

In an exemplary configuration of the microscope according to the second aspect of the invention, the button may be an illuminative button or a button that can light an illuminative device, which is configured to be lighted and extinguished respectively when the operative coupling between the knob and the said other elements is established and disconnected by means of the button signal emitted by it.

The significance of the invention is to enable the operator of an automated microscope with many functions to operate the microscope in the conventional stand-alone mode in a traditional and comfortable way without use of computer and software. In the whole stand-alone mode, the operator can conduct continuous observation without turning the eyesight away from the eyepiece. In the microscope according to the invention, additional element control functions (including control of vertical and horizontal movement of the stage) can be performed by means of the existing focus knob for adjusting the raising and lowering of the stage, so that control of the movement of the stage in the horizontal plane (in order to locate the observation target on the specimen or sample) is as convenient as control of vertical focusing of the stage in the traditional method. Meanwhile, as the stage of the microscope according to the invention can be moved along the x direction and the y direction simultaneously in the horizontal plane, the speed of locating the observation target on the specimen or sample can be accelerated. In the invention, the same knob can be used to additionally control other elements of the microscope, such as the objective lens, reflector, and OSD, and a button is used to simply switch between the various functions of the knob. Good hand-feeling can be provided by operating these elements and functions. In this way, less operating devices may be used in the microscope and advantages of the knob in terms of operation, such as convenience, preciseness and compliance with conventional operation habit, may be utilized. Therefore, the microscope according to the invention has a simple structure and a reduced cost, and is easier for operation.

The above and other technical effects of the invention can be clearly understood through the following description of embodiments thereof with reference to the drawings.

DETAILED DESCRIPTION OF THE EMBODIMENTS

Figure 1:
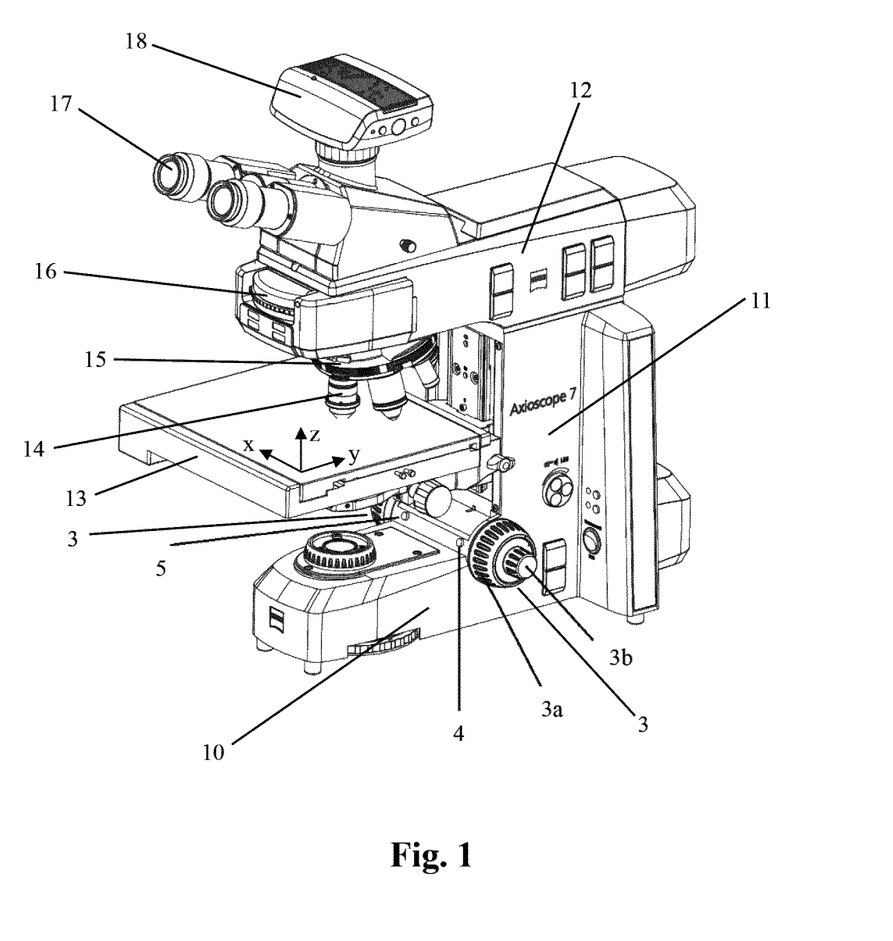
FIG. 1 is an overview of the microscope according to an embodiment of the invention.

As shown in FIG. 1, the microscope according to an embodiment of the invention includes, e.g., a stand 10, a post 11, an arm 12, a stage 13, objective lenses 14, an objective nosepiece 15, a reflector turret 16, an eyepiece 17, and an optional camera 18. The basic structure and working method are common knowledge in the art and will not be described in detail here.

The microscope according to the invention in particular includes a (rotary) knob 3 for controlling the raising and lowering of the stage 13 to adjust the observation focus. Typically, the knob 3 is a composite knob formed by coaxially arranging a coarse adjusting wheel 3a and a fine adjusting wheel 3b. Nevertheless, the coarse adjusting wheel 3a and the fine adjusting wheel 3b may also be arranged separately at different positions on the microscope, i.e. as two different focus knobs of the microscope. In addition, the microscope may be provided with one knob 3 on each of the left and right sides as shown in FIG. 1, so that the user can adjust the focus with either hand. The two knobs 3 on left and right sides may be coaxially arranged for synchronous rotation (in this case, the two knobs on left and right sides are actually equivalent to a single knob in respect of function) or separately arranged for rotation independently of each other. Besides, theoretically, more knobs 3 may be arranged in other proper positions on the microscope.

In the microscope according to one embodiment of the invention, the movements of the stage 13 along the left-right, front-rear, and up-down directions (also referred to as x direction, y direction, and z direction, respectively) may be driven e.g. by three motors (x motor, y motor, and z motor, not shown). According to the invention, the knob 3 can not only adjust the raising and lowering of the stage 13 as in an ordinary microscope in the prior art by controlling operation of the z motor, but also adjust the position of the stage 13 in the horizontal plane (along the x direction and/or the y direction) by controlling operation of the x motor and/or the y motor. Nevertheless, the control of the position of the stage 13 along the x direction, y direction, and z direction by the knob 3 may also be achieved by means of mechanical transmission and mechanical driving device (e.g. pinion and rack) or any other driving mechanism in a proper form between the knob 3 and the stage 13. In the invention, the z motor or other types of driving mechanism that drive the stage to move along the up-down direction are collectively referred to as "z axis focusing driving mechanism".

In order to control operation of the x motor, y motor, and z axis focusing driving mechanism through rotation of the knob 3, a controller (not shown), e.g. an electronic control unit, is provided inside the microscope. The controller (or control system) may be embodied as a combination of a processor and a storage containing corresponding control programs, or as an analog and/or digital circuit such as Application Specific Integrated Circuit (ASIC), Field Programmable Gate Array (FPGA) etc. The knob 3 is operatively coupled to the x motor and/or y motor or the z axis focusing driving mechanism selectively by means of the controller. In the invention, such statements as "the former is operatively coupled to the latter" or "the operative coupling between the former and the latter" mean that a predetermined action/operation of the former can cause and control a corresponding action of the latter through the coupling. For example, the knob is operatively coupled to the motor means that the rotation of the knob can start and control the operation of the motor (including rotation speed and revolutions of the motor) through the coupling.

Figure 2:
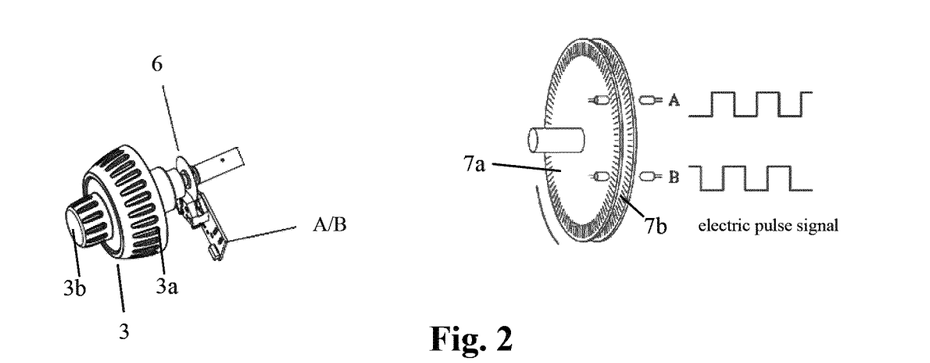
FIG. 2 is an illustrative diagram of the exemplary working principle of the knob in the microscope according to the embodiment of the invention.

In one embodiment of the invention, control of the motors by the knob 3 is achieved by installing a rotary encoder 6 on it as shown in FIG. 2. The rotary encoder 6 includes an encoding disc 7a that rotates along with rotation of the knob 3, a mask 7b which is arranged to be stationary coaxially to and facing the disc 7a, and photoelectric detection devices A and B arranged in pairs on opposite sides of the disc 7a and the mask 7b. The rotary encoder 6 can transfer the angular displacement of the knob 3 to electric pulse signals for controlling operation of the motors. The structure and working method of a rotary encoder are common knowledge in the art and will not be described in detail here.

In this embodiment, as the original function of the knob 3 is to control the raising and lowering of the stage 13 for focusing, the operative coupling between the knob 3 and the z axis focusing driving mechanism is the "normal operative coupling" as referred to in the invention, which means that the knob 3 is always operatively coupled to the z axis focusing driving mechanism in the normal default state, and the operative coupling therebetween is disconnected only under preset conditions.

The above preset conditions include e.g. the case where movement of the stage 13 along the x direction and/or y direction is required. In this case, in order to notify the controller to disconnect the operative coupling between the knob 3 and the z axis focusing driving mechanism and establish operative coupling between the knob 3 and the x motor and/or the y motor to control operation of the x motor and/or the y motor, the microscope according to this embodiment further includes at least one button, which is coupled to the controller in communication and sends to it a button signal indicating that the button has been triggered by operation of the user of the microscope. The button is preferably arranged in the vicinity of the focus knob, so that the user can conveniently operate the button with either hand while simultaneously operating the knob. More preferably, the button is arranged in the vicinity of the focus knob so that the user can operate the button by his/her thumb while operating the knob. In the invention, "button" shall be understood as any device or switch that can detect and identify predefined operations (such as pressing, pressing and holding, clicking, double clicking, touching, flicking etc.) of the microscope user in a touch sensitive, thermosensitive, photosensitive or any other manner, including without being limited to a press-down button, a key (rebound button), a switch lever or a touch sensitive, thermosensitive, or photosensitive region arranged at a certain position of the microscope. After being triggered by a predefined operation of the user, the button can emit a button signal indicating the predefined operation and send the button signal to the controller through the communicative coupling (wired or wireless) between the button and the controller. Depending on the type and operating manner of the button, the button signal may be either continuous or transient. For example, for an ordinary press-down button, it will be kept in a pressed-down state after being pressed, thereby generating a continuous button signal that disappears until the button is pressed again; for a key, it can generate three types of button signals by being pressed and held, clicked, and double clicked, which are a continuous signal and two different transient signals, respectively.

In this embodiment, the controller is configured to disconnect the normal operative coupling between the knob 3 and the z axis focusing driving mechanism and establish an operative coupling between the knob 3 and the x motor and/or y motor when receiving a predetermined button signal (e.g. a continuous signal for an ordinary press-down button, and any one of the above three types of button signals for a key), and restore the normal operative coupling between the knob 3 and the z axis focusing driving mechanism and disconnect the operative coupling between the knob 3 and the x motor and/or y motor when no longer receiving the predetermined button signal or when receiving a next button signal (for example, the above normal operative coupling may be restored if the generated continuous button signal disappears when a press-down button is reset or when a key is released after being pressed down and held for some time; or alternatively, a transient signal generated by a first click on a key will disconnect the above normal operative coupling, while a second transient signal generated by the next click will restore the above normal operative coupling, and then the disconnection and restoration of the normal operative coupling will be alternated in this way upon each next click).

In the microscope shown in FIG. 1, two buttons 4 and 5 are arranged, and the controller is configured such that the operative coupling between the knob 3 and the x motor is established or disconnected only according to the button signal from one of the two buttons (e.g. the button 4), and the operative coupling between the knob 3 and the y motor is established or disconnected only according to the button signal from the other button (e.g. the button 5). Therefore, the button 4 may also be referred to as x button, while the button 5 may be referred to as y button.

Figure 3:
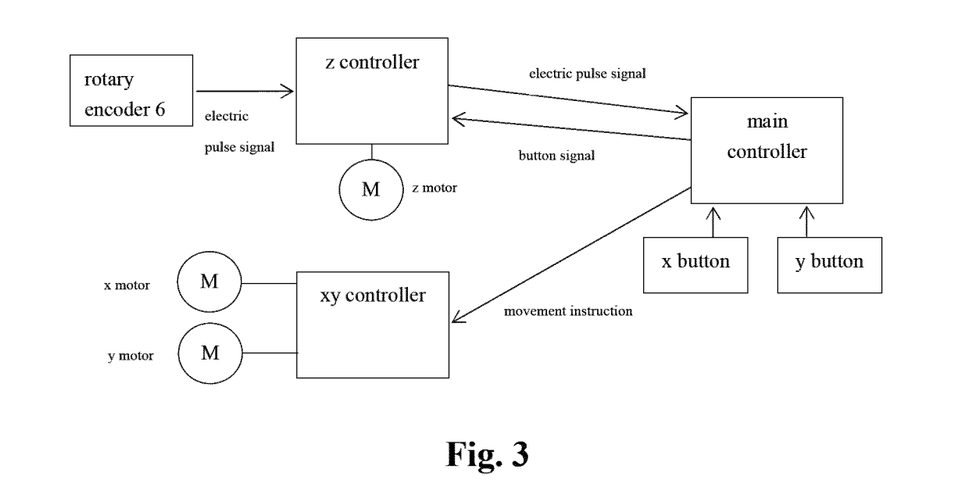
FIGS. 3 to 6 are illustrative block diagrams of the elements control in the microscope according to the embodiment of the invention.

FIG. 3 is an overall block diagram of an exemplary way that uses the x button and the y button to respectively control the x motor and the y motor for driving the stage to move. In this embodiment, the z axis focusing driving mechanism may be e.g. the z motor; the controller may include a main controller, a z controller coupled to the z motor and the main controller, and an xy controller coupled to the x motor, the y motor, and the main controller. The main controller is configured to receive button signals from the x button or y button and send them to the z controller. The z controller is configured to receive electric pulse signals from the rotary encoder 6 of the knob 3, and determines whether to transmit the electric pulse signals to the main controller or not according to the received button signals. The main controller is further configured to calculate the amount and direction of movement according to the electric pulse signal after receiving it from the z controller and send a corresponding movement instruction to the xy controller. The xy controller is configured to control operation of the x motor or the y motor according to the movement instruction received from the main controller.

Figure 4:
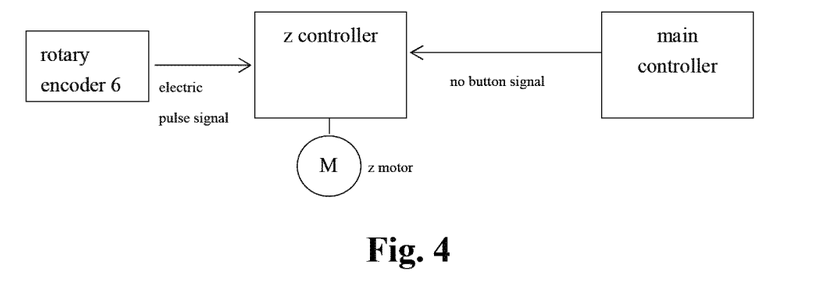
Figure 5:
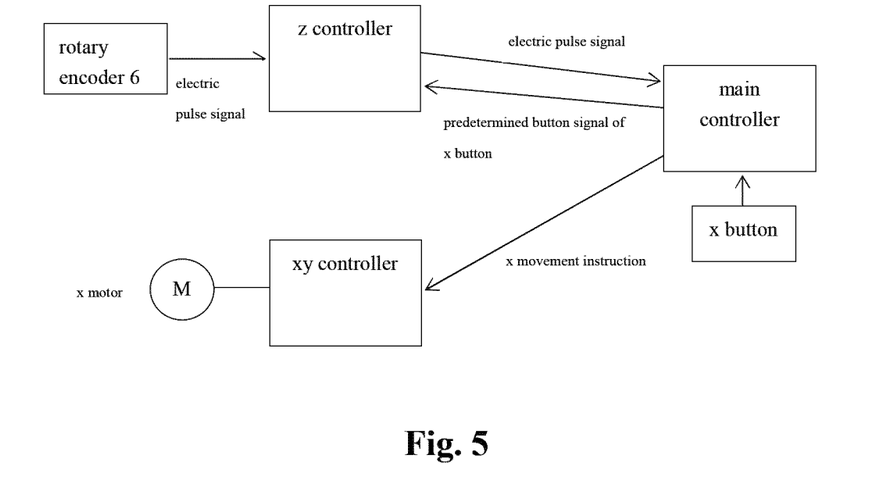
Figure 6:
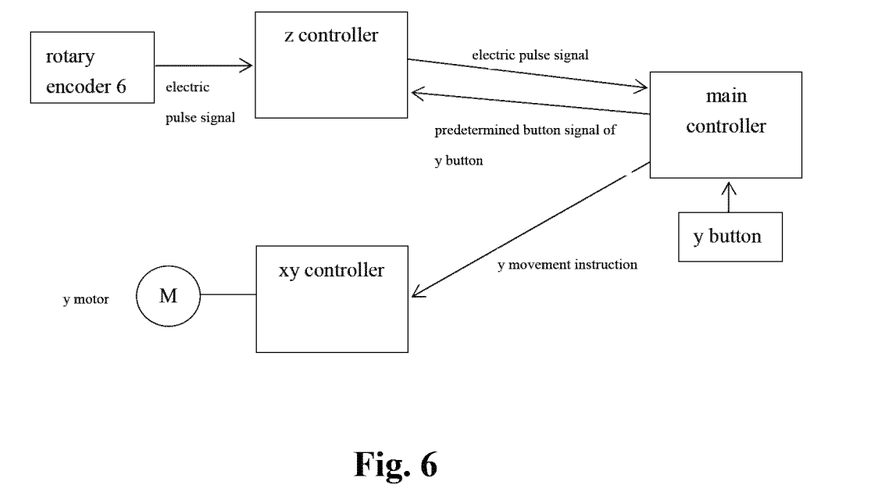

More specifically, the block diagram in FIG. 3 may be divided into three different control scenarios as shown in FIGS. 4 to 6.

In FIG. 4, neither of the x button and the y button is operated; therefore, no button signal is sent to the main controller and the z controller; the z controller then directly controls operation of the z motor according to the electric pulse signals received from the rotary encoder 6. This is a state where a normal operative coupling is established between the knob 3 and the z motor.

In FIG. 5, the x button is triggered by a predefined operation and sends its predetermined button signal to the main controller, which in turn sends the predetermined button signal to the z controller; after receiving the predetermined button signal, the z controller forwards the electric pulse signal received from the rotary encoder 6 to the main controller and stop controlling the z motor according to the electric pulse signal (i.e. the normal operative coupling between the knob 3 and the z motor is disconnected); the main controller then calculates a corresponding movement instruction according to the received electric pulse signal and sends it to the xy controller; and then the xy controller controls operation of the x motor according to the movement instruction. Likewise, in FIG. 6, the y button is triggered by a predefined operation and sends its predetermined button signal to the main controller, which in turn sends the predetermined button signal to the z controller; after receiving the predetermined button signal, the z controller forwards the electric pulse signal received from the rotary encoder 6 to the main controller and stops controlling the z motor according to the electric pulse signal (i.e. the normal operative coupling between the knob 3 and the z motor is disconnected); the main controller then calculates a corresponding movement instruction according to the received electric pulse signal and sends it to the xy controller; and then the xy controller controls operation of the y motor according to the movement instruction.

It is to be noted that as stated above, when the main controller and z controller in FIGS. 5 and 6 no longer receive the predetermined button signal from the x button or y button, or receive a next button signal that will result in restoration of the normal operative coupling, the z controller restores the control of the z motor according to the electric pulse signal, that is, the state where a normal operative coupling is established between the knob 3 and the z motor as shown in FIG. 4 is resumed.

In the above embodiment, for clarity of the control program, three controllers, i.e. the main controller, z controller, and xy controller, are adopted; however, any two or even all of the three controllers may be integrated together in the real designs.

In the above embodiment, two buttons are arranged; that is, the knob 3 controls starting of the x motor and the y motor respectively depending on whether the x button or the y button is triggered. However, according to another embodiment of the invention, it is also acceptable to adopt only one button, or two buttons that are placed at the same positions as in the above embodiment but emit identical signals when triggered (that is, the controller receives identical signals from the two buttons when they are triggered in the same way; hereinafter these two buttons are referred to as "two identical buttons"). Preferably, the one button or two identical buttons are arranged in the vicinity of the focus knob 3, so that the user can conveniently operate the button while adjusting focus. When the one button or any one of the two identical buttons is triggered, the controller disconnects the normal operative coupling between the knob 3 and the z axis focusing driving mechanism and establishes an operative coupling between the knob 3 and the x motor and/or y motor. In this case, e.g. each of left and right sides of the microscope may be provided with one knob 3 (first knob and second knob), which is essentially equivalent to the case where the above two knobs 3 on left and right sides are separately configured so that they can be rotated independently of each other, and the controller controls the x motor and y motor respectively according to the respective electric pulse signals emitted by the rotary encoders of the first knob and the second knob. For example, the first knob on the left side controls the x motor, and the second knob on the right side controls the y motor, or vice versa. In addition, if the first knob and the second knob are simultaneously operated by the two hands of the user, operations of the x motor and of the y motor can be controlled at the same time, so that the stage 13 can move along both the x direction and the y direction, i.e. move diagonally in the horizontal plane.

Figure 8:
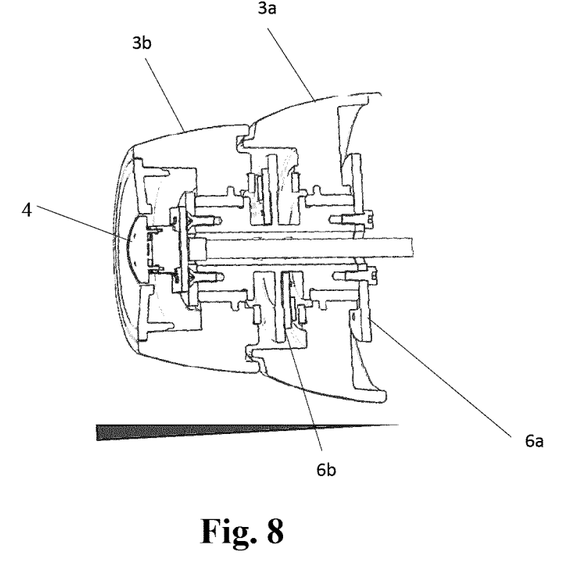
FIG. 8 is a sectional view of another type of exemplary knob in the microscope according to the embodiment of the invention.

In the embodiment shown in FIG. 1, for the convenience of operation, the buttons 4 and 5 may be arranged in the vicinity of the respective knobs 3. Or alternatively, as shown in FIG. 8, the button 4 may be directly integrated at the center of an end of the knob 3 and configured such that the operation direction of the button is parallel to the direction of the rotation axis of the knob 3.

In addition, in the composite knob 3 as shown in FIG. 2, the coarse adjusting wheel 3a and the fine adjusting wheel 3b share the same rotary encoder 6; and in this case, the two adjusting wheels have different rotary transmission ratios relative to the encoding disc 7a. Nevertheless, as shown in FIG. 8, the coarse adjusting wheel 3a and the fine adjusting wheel 3b may also be provided with respective rotary encoders 6a and 6b.

Moreover, in order that the user can clearly recognize whether the knob 3 is currently in a state of controlling the z axis focusing driving mechanism or the x motor and/or y motor, the button may be configured as an illuminative button with a built-in LED light, or an LED indicator light may be arranged outside the button. The illuminative button or LED indicator light may be e.g. configured to be lighted and extinguished respectively when the operative coupling between the knob 3 and the x motor and/or y motor is established and disconnected according to the button signal emitted by the button. That is to say, when the knob 3 is in the default normal state of controlling the z axis focusing driving mechanism, the button is extinguished, and when the button is triggered to control the x motor and/or the y motor, the illuminative button or the LED indicator light is lighted. The illuminative property of the button is especially useful when the user cannot determine whether the button has been triggered or not by observing its appearance. For example, if disconnection and restoration of the normal operative coupling between the knob 3 and the z axis focusing driving mechanism are alternated by successively clicking the button, it is necessary to notify the user through the illumination state of the button whether the knob 3 currently controls the z axis focusing driving mechanism or the x motor and/or y motor.

The embodiment in which the focus knob in the microscope according to the invention is used to control not only the raising and lowering but the horizontal movement of the stage has been described hereinabove. Nevertheless, by providing corresponding switching button(s), the knob may be used to control other elements of the microscope apart from the stage.

Figure 7:
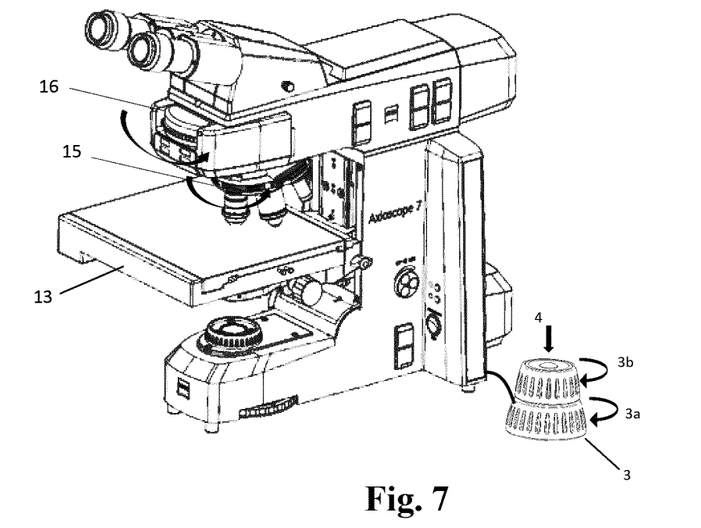
FIG. 7 is a perspective view of the microscope according to another embodiment of the invention.

In the embodiment shown in FIG. 7, the knob 3 may control rotation of the objective nosepiece 15 and the reflector turret 16 in addition to the movement of the stage 13. In a standard microscope, the reflector turret 16 is a rotary device that switches different light filter applications and contrast ratios of the microscope, and the objective nosepiece 15 is a rotary device that switches objective lenses with different magnifications.

The knob 3 is a composite knob that includes a first adjusting wheel 3a and a second adjusting wheel 3b (corresponding to the "coarse adjusting wheel" and "fine adjusting wheel" hereinabove), and the button 4 is integrated in the knob 3 as shown in FIG. 8. Nevertheless, the button 4 may also be arranged in other positions of the microscope. The button 4 serves as a switch button that switches the function of the knob 3 from controlling the stage 13 to controlling the objective nosepiece 15 and/or the reflector turret 16. The rotations of the objective nosepiece 15 and the reflector turret 16 are driven by their respective motors. Nevertheless, the driving may also be achieved through mechanical transmission and mechanical driving device (i.e. pinion and rack). The microscope in this embodiment likewise includes a controller, and the controller, the knob 3, and the button 4 work in the same way as in the above embodiment. In this embodiment, after the button 4 is triggered, the first adjusting wheel 3a may be configured to control during its rotation the rotation of one of the objective nosepiece 15 and the reflector turret 16, while the second adjusting wheel 3b is configured to control during its rotation the rotation of the other of the objective nosepiece 15 and the reflector turret 16. It is also possible to arrange a first knob and a second knob on the left and right sides of the microscope to rotate the objective nosepiece 15 and the reflector turret 16, respectively.

Figure 9:
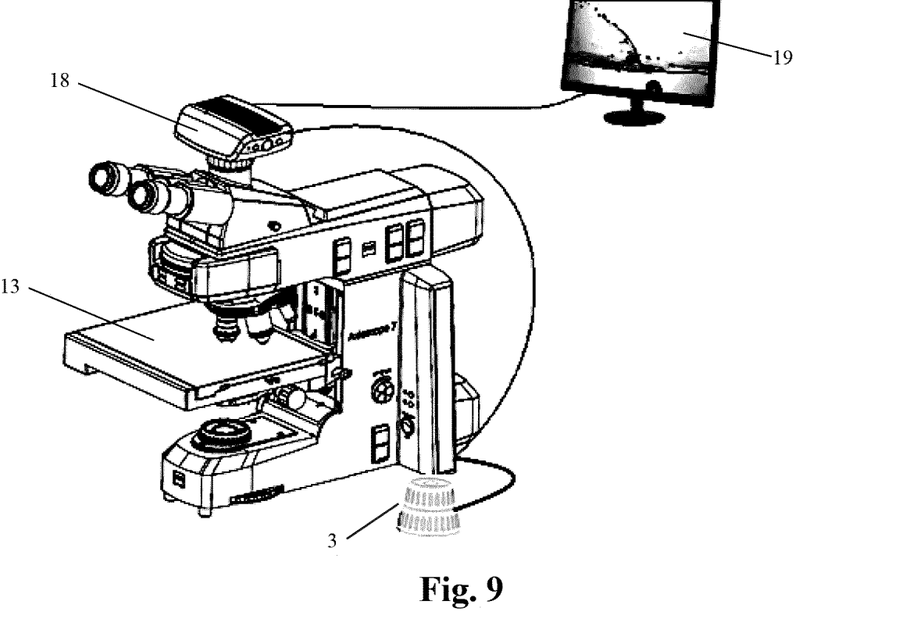
FIG. 9 is an overview of the microscope according to a further embodiment of the invention.
Figure 10:
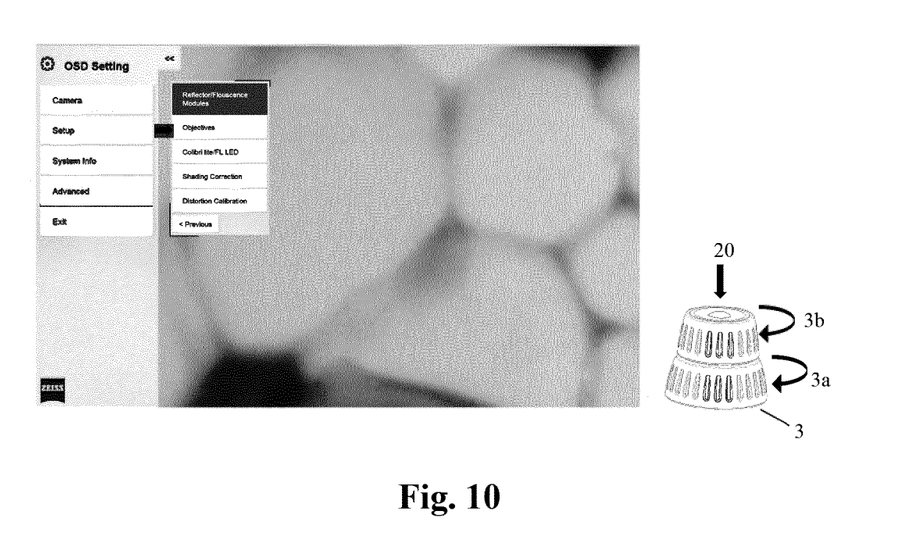
FIG. 10 is an illustrative diagram of operation of the knob in the microscope shown in FIG. 9.

In the embodiment shown in FIGS. 9 and 10, the knob 3 can control the OSD system of the microscope in addition to the movement of the stage 13. The OSD system may include a camera 18 and a screen or touch pad 19 connected thereto. The configuration of the knob 3 is the same as that in the embodiment shown in FIG. 8. However, the switch button in this embodiment is another button arranged on e.g. the camera 18, rather than the button 20 integrated in the knob 3. After being triggered, the button on the camera can turn the OSD system into a setting mode, in which the menu setting image as shown in FIG. 10 can be seen on the screen 19. In the present embodiment, for instance, the first adjusting wheel 3a of the knob 3 may be configured to scroll up and down by its rotation to select an item in the same level of menu in the OSD system, while the second adjusting wheel 3b may be configured to switch by its rotation between adjacent levels of menu in the OSD system (i.e. entering a lower level or returning to an upper level of the menu), and the button 20 integrated in the knob 3 may be used as a confirmation button for confirming selection of a menu item after being operated.

In the embodiments shown in FIGS. 7, 9, and 10, the above switch button may likewise be configured as an illuminative button or a button with an external LED indicator light, and the first and second adjusting wheels in the knob 3 may also share one rotary encoder or be provided with their respective rotary encoders.

The buttons described in the above embodiments can achieve switching between various functions of the focus knob. Nevertheless, in addition to this, these buttons may also be configured to achieve other functions of controlling microscope elements when triggered in a different way from the above function switching operations. For example, a button in the form of a key may be configured to quickly lower the stage to the specimen loading/unloading position when double clicked and return the stage back to the original position when double clicked again; it may also be configured to realize other different functions when clicked in different modes (e.g. working mode and setting mode) of the microscope (e.g. it may be arranged to start the camera in the working mode, and to save the parfocal position of the current objective lens in the setting mode); or it may be configured to start the camera for video recording after being pressed down for a certain period (e.g. 5 seconds) and to exit the video recording mode when clicked again.

Various modifications and variations may be made to the embodiments disclosed herein by those skilled in the art without departing from the scope or spirit of the invention. Other embodiments of the invention will be obvious to those skilled in the art based on implementation of the invention as disclosed herein. The specification and the examples disclosed herein shall be considered exemplary only and the true scope of the invention is defined by the following claims and equivalents thereof.

The invention claimed is:

1. A microscope comprising:
a stage;
an x motor, a y motor, and a z axis focusing driving mechanism that drive the stage to move along left-right, front-rear, and up-down directions respectively;
a controller;
at least one knob which is operatively coupled to the x motor or y motor or the z axis focusing driving mechanism selectively by means of the controller to control operation of a coupled motor or the coupled z axis focusing driving mechanism; and
at least one button which is coupled to the controller in communication and sends to the controller one or more types of button signals indicating that the button has been triggered by operation of a microscope user,
wherein the controller is configured to disconnect a normal operative coupling between the knob and the z axis focusing driving mechanism and establish an operative coupling between the knob and the x motor or y motor when receiving a triggered predetermined button signal, and restore the normal operative coupling between the knob and the z axis focusing driving mechanism and disconnect the operative coupling between the knob and the x motor or y motor when no longer receiving the triggered predetermined button signal or when receiving a next triggered button signal;
wherein the z axis focusing driving mechanism is a z motor, and a rotary encoder is installed on the knob, wherein the rotary encoder converts angular displacement of the knob to an electric pulse signal for controlling operation of the x motor, v motor, or z motor; and
wherein the controller includes a main controller, a z controller coupled to the z motor and the main controller, and an xy controller coupled to the x motor, the y motor, and the main controller; the main controller is configured to receive a button signal from the button and send the button signal to the z controller; the z controller is configured to receive the electric pulse signal from the knob, forward the electric pulse signal to the main controller when receiving the triggered predetermined button signal without controlling the z motor according to the electric pulse signal, and restore the control of the z motor according to the electric pulse signal when no longer receiving the triggered predetermined button signal or when receiving a next triggered button signal; the main controller is further configured to calculate an amount and direction of movement according to the electric pulse signal when receiving it from the z controller and send a corresponding movement instruction to the xv controller; and the xv controller is configured to control operation of the x motor or y motor according to the movement instruction received from the main controller.

2. The microscope according to claim 1, wherein the controller further is configured to disconnect a normal operative coupling between the knob and the stage and establish an operative coupling between the knob and other elements of the microscope, selected from the group: an objective nosepiece, a reflector turret, a menu of an On-Screen-Display (OSD) system of the microscope, a microscope camera, a microscope settings memory, an illumination device, to control operations of the said other elements when receiving a triggered predetermined button signal, and restore the normal operative coupling between the knob and the stage and disconnect the operative coupling between the knob and the said other elements when no longer receiving the triggered predetermined button signal or when receiving a next triggered button signal.

3. The microscope according to claim 1, characterized in that the at least one button includes an x button and a y button, and the controller is configured to establish or disconnect the operative coupling between the knob and the x motor according to the button signal from the x button, and establish or disconnect the operative coupling between the knob and they motor according to the button signal from the y button.

4. The microscope according to claim 1, characterized in that the at least one knob includes a first knob and a second knob which are configured to be able to establish or disconnect the operative coupling with the x motor and the y motor respectively by operating the button.

5. The microscope according to claim 1, characterized in that the button is arranged in a vicinity of the knob so that the microscope user can operate the knob and the button simultaneously with a same hand, or is arranged at an end of the knob, or is arranged inside the knob so that the operation direction of the button is parallel to a rotation axis of the knob.

6. The microscope according to claim 1, characterized in that the button is an illuminative button or a button that can light an illuminative device, which is configured to be lighted and extinguished respectively when the operative coupling between the knob and the x motor or the y motor is established and disconnected by means of the button signal emitted by it.

7. The microscope according to claim 1, characterized in that at least one of the knob is a composite knob consisting of a coarse adjusting wheel and a fine adjusting wheel which are coaxially arranged.

8. The microscope according to claim 5, characterized in that at least one of the knob is a composite knob consisting of a coarse adjusting wheel and a fine adjusting wheel which are coaxially arranged; the coarse adjusting wheel and the fine adjusting wheel share one rotary encoder or are provided with their respective rotary encoders.

9. The microscope according to claim 2, characterized in that the knob is configured to control during its rotation the rotation of the objective nosepiece or the rotation of the reflector turret or the scrolling of menu items of the OSD system of the microscope.

10. The microscope according to claim 2, characterized in that the button is configured to trigger the function(s) of saving a parfocal position of a current working objective lens or loading/unloading position of the stage in the microscope settings memory when operated in a predetermined way.

11. The microscope according to claim 2, characterized in that the at least one knob includes two knobs arranged at the left side and right side of the microscope respectively; a left knob is configured to control during its rotation the rotation of one of the objective nosepiece and the reflector turret, and the right knob is configured to control during its rotation the rotation of the other of the objective nosepiece and the reflector turret.

12. A microscope comprising:
a stage;
an x motor, a y motor, and a z axis focusing driving mechanism that drive the stage to move along left-right, front-rear, and up-down directions respectively;
a controller;
at least one knob which is operatively coupled to the x motor or y motor or the z axis focusing driving mechanism selectively by means of the controller to control operation of a coupled motor or the coupled z axis focusing driving mechanism; and
at least one button which is coupled to the controller in communication and sends to the controller one or more types of button signals indicating that the button has been triggered by operation of a microscope user,
wherein the controller is configured to disconnect a normal operative coupling between the knob and the z axis focusing driving mechanism and establish an operative coupling between the knob and the x motor or y motor when receiving a triggered predetermined button signal, and restore the normal operative coupling between the knob and the z axis focusing driving mechanism and disconnect the operative coupling between the knob and the x motor or y motor when no longer receiving the triggered predetermined button signal or when receiving a next triggered button signal;
wherein the controller further is configured to disconnect a normal operative coupling between the knob and the stage and establish an operative coupling between the knob and other elements of the microscope, selected from the group: an objective nosepiece, a reflector turret, a menu of an On-Screen-Display (OSD) system of the microscope, a microscope camera, a microscope settings memory, an illumination device, to control operations of the said other elements when receiving a triggered predetermined button signal, and restore the normal operative coupling between the knob and the stage and disconnect the operative coupling between the knob and the said other elements when no longer receiving the triggered predetermined button signal or when receiving a next triggered button signal; and
the knob is configured to control during its rotation the rotation of the objective nosepiece or the rotation of the reflector turret or the scrolling of menu items of the OSD system of the microscope.

13. A microscope comprising:
a stage;
an x motor, a y motor, and a z axis focusing driving mechanism that drive the stage to move along left-right, front-rear, and up-down directions respectively;
a controller;
at least one knob which is operatively coupled to the x motor or y motor or the z axis focusing driving mechanism selectively by means of the controller to control operation of a coupled motor or the coupled z axis focusing driving mechanism; and
at least one button which is coupled to the controller in communication and sends to the controller one or more types of button signals indicating that the button has been triggered by operation of a microscope user,
wherein the controller is configured to disconnect a normal operative coupling between the knob and the z axis focusing driving mechanism and establish an operative coupling between the knob and the x motor or y motor when receiving a triggered predetermined button signal, and restore the normal operative coupling between the knob and the z axis focusing driving mechanism and disconnect the operative coupling between the knob and the x motor or y motor when no longer receiving the triggered predetermined button signal or when receiving a next triggered button signal;
wherein the controller further is configured to disconnect a normal operative coupling between the knob and the stage and establish an operative coupling between the knob and other elements of the microscope, selected from the group: an objective nosepiece, a reflector turret, a menu of an On-Screen-Display (OSD) system of the microscope, a microscope camera, a microscope settings memory, an illumination device, to control operations of the said other elements when receiving a triggered predetermined button signal, and restore the normal operative coupling between the knob and the stage and disconnect the operative coupling between the knob and the said other elements when no longer receiving the triggered predetermined button signal or when receiving a next triggered button signal; and the button is configured to trigger the function(s) of saving parfocal position of a current working objective lens or loading/unloading position of the stage in the microscope settings memory when operated in a predetermined way.

14. A microscope comprising:

a stage;

an x motor, a y motor, and a z axis focusing driving mechanism that drive the stage to move along left-right, front-rear, and up-down directions respectively;

a controller;

at least one knob which is operatively coupled to the x motor or y motor or the z axis focusing driving mechanism selectively by means of the controller to control operation of a coupled motor or the coupled z axis focusing driving mechanism; and at least one button which is coupled to the controller in communication and sends to the controller one or more types of button signals indicating that the button has been triggered by operation of a microscope user, wherein the controller is configured to disconnect a normal operative coupling between the knob and the z axis focusing driving mechanism and establish an operative coupling between the knob and the x motor or y motor when receiving a triggered predetermined button signal, and restore the normal operative coupling between the knob and the z axis focusing driving mechanism and disconnect the operative coupling between the knob and the x motor or y motor when no longer receiving the triggered predetermined button signal or when receiving a next triggered button signal;

wherein the controller further is configured to disconnect a normal operative coupling between the knob and the stage and establish an operative coupling between the knob and other elements of the microscope, selected from the group: an objective nosepiece, a reflector turret, a menu of an On-Screen-Display (OSD) system of the microscope, a microscope camera, a microscope settings memory, an illumination device, to control operations of the said other elements when receiving a triggered predetermined button signal, and restore the normal operative coupling between the knob and the stage and disconnect the operative coupling between the knob and the said other elements when no longer receiving the triggered predetermined button signal or when receiving a next triggered button signal; and the at least one knob includes two knobs arranged at the left side and right side of the microscope respectively; a left knob is configured to control during its rotation the rotation of one of the objective nosepiece and the reflector turret, and the right knob is configured to control during its rotation the rotation of the other of the objective nosepiece and the reflector turret.

* * * * *